June 8, 1943.  A. LOUGHLIN  2,321,223
SAW HANDLE
Filed May 2, 1942
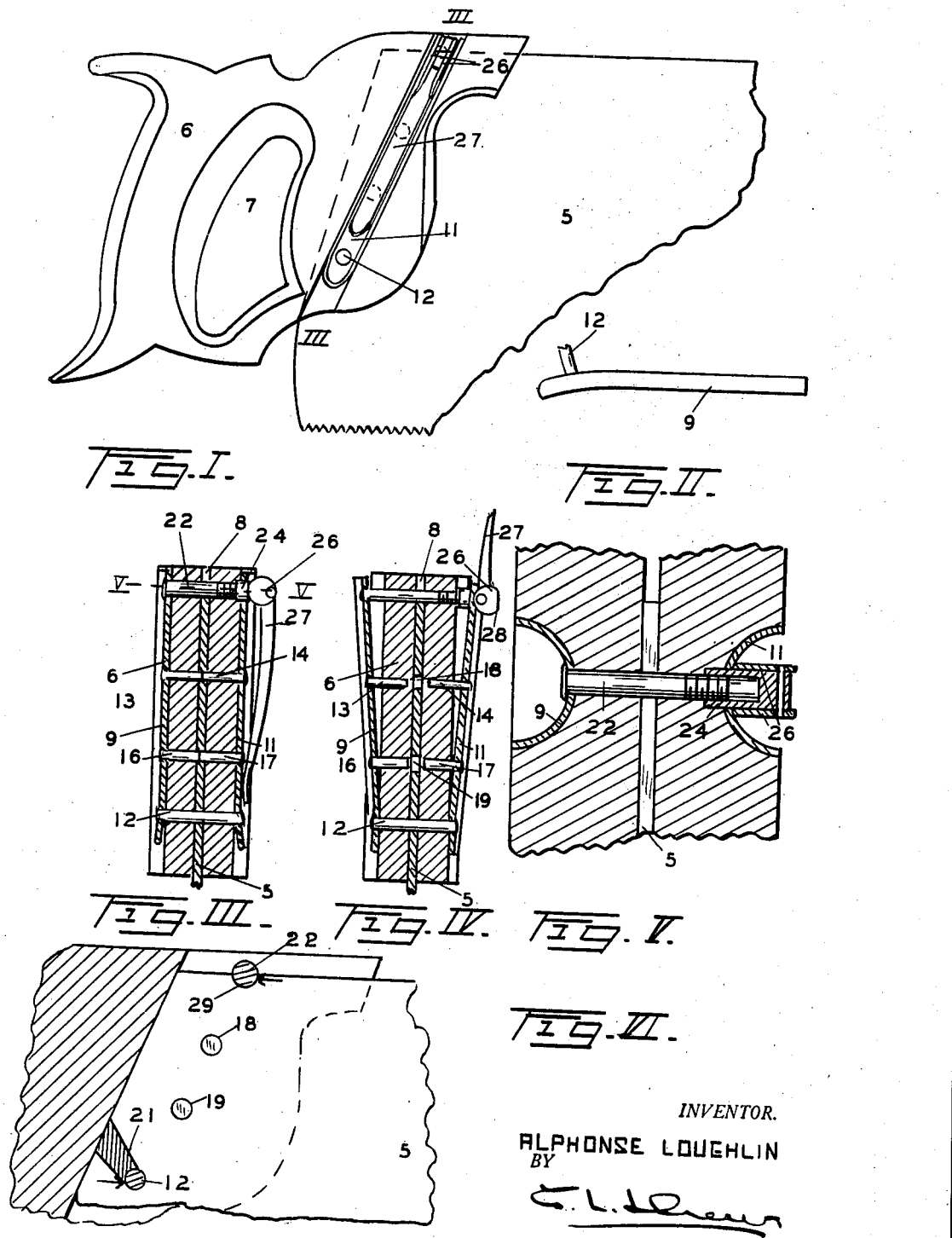
INVENTOR.
ALPHONSE LOUGHLIN
BY Patented June 8, 1943

2,321,223

UNITED STATES PATENT OFFICE 2,321,223

SAW HANDLE

Alphonse Loughlin, San Francisco, Calif.

Application May 2, 1942, Serial No. 441,504

1 Claim. (Cl. 145—108)

This improvement relates to improvements in saw handles and has particular reference to a handle which may be removed from the saw blade.

The principal object of this invention is to provide a removable saw handle which may be quickly changed from one saw blade to another.

A further object is to produce a device of this character which is economical to manufacture and easy to install upon a standard form of handle.

A still further object is to produce a device wherein the saw blade will be rigidly held in the handle and to further provide an arrangement whereby the exertion of sawing will not tend to loosen the handle from the saw blade.

Other objects and advantages will be apparent during the course of the following description.

In the accompanying drawing forming a part of this specification and in which like numerals are employed to designate like parts throughout the same, Fig. I is a fragmentary side elevation of a saw having my invention applied thereto.

Fig. II is a side elevation of one of the clamp plates.

Fig. III is an enlarged detailed cross-sectional view taken on the line III—III of Figure I.

Figure IV is a similar view showing the parts in open position.

Figure V is an enlarged detail view taken on the line V—V of Figure III.

Figure VI is a fragmentary detailed view, partly in cross-section, showing the manner in which the blade is positioned in the saw handle.

It has been customary for many years to produce saws wherein a blade was secured by bolts, rivets or other fastenings to a handle, which handle had considerable thickness. The result of this construction is that when a carpenter attempts to store several saws in his tool box the thickness of the handles takes up a great deal more room than the thickness of the saw blades; also, the length of the handle beyond the length of the saw blade requires a much longer tool box than would be required for the blade alone.

Applicant has, therefore, devised a quick, simple and efficient means of overcoming these difficulties and has constructed a handle and fastening element which permits a single handle to be used for any number of blades desired and which handle may be quickly removed so that the blades may be positioned in the tool box and occupy a minimum amount of space, that is as to thickness, when placed one against the other, and as to length, due to the fact that the handle has been removed and that only one handle is employed for a large number of blades.

In the accompanying drawing wherein for the purpose of illustration is shown a preferred embodiment of my invention, the number 5 designates a standard saw blade such as is commonly used by carpenters and other mechanics. The numeral 6 designates the handle as a whole, having the usual hand hole 7 and a slot 8, into which the blade 5 slips. The construction thus far described is standard and it is to this standard construction that I add my improvement.

My improvement consists of a pair of clamping plates 9 and 11, which plates are positioned upon the side of the handle and are recessed into the handle. The bottom of these plates are joined together by a cross pin 12 and each carry opposed pins as shown at 13—14 and 16—17, which are of sufficient length so that when the clamping plates are in clamping position the ends of these pins will abut each other and pass through openings 18—19 respectively in the saw blade 5. The saw blade also has an angularly disposed slot 21, the purpose of which is later seen.

Secured to the upper end of the clamping plate 9 is a threaded bolt 22 having a threaded nut 24 to which is pivotedly attached cams 26 formed upon a handle 27. The cams have a flat portion 28 which when in the position of Figure III bear against the plate 11.

With the construction thus shown, when the parts are in the position of Figure 4, the saw blade 5 may be moved into the slot 8 of the handle, so that the angularly disposed slot 21 in the blade 5 will engage the cross-pin 12 and come to rest as shown in Figure VI.

A notch 29 formed in the top of the saw will engage the under surface of the bolt 22. By now moving the handle 27 to the position of Figure III the two plates will be moved toward each other, causing the opposed pins 13—14 and 16—17 to abut each other within the openings 18 and 19 of the saw, as shown in Figure III.

At the same time the curved lower ends of the plates 9 and 11 will bear against the lower portion of the handle and force it against the saw blade, thus pinching the parts tightly together.

It will be noted that when the saw is locked in position and in use any pressure upon the tooth portion of the saw will tend to cause a tipping action of the plate with respect to the handle. This tipping action will draw the lower portion of the blade against the pin 12, as shown by the arrow at the bottom of Figure VI and will tend to force the top part of the saw against the tightening bolt, as shown by the arrow at the top of the figure.

It is to be understood that the form of my invention herewith shown and described is to be taken as a preferred example of the same and that various changes relative to the material, size, shape and arrangement of parts may be resorted to without departing from the spirit of the invention or the scope of the subjected claim.

Having thus described my invention, I claim:

The combination of a saw blade and a handle therefor, said handle having a slot formed therein, a pair of spaced pins carried by said handle and extending across said slot, said saw blade having an inclined slot formed therein and a notch formed in its upper margin, said slot and said notch engaging said spaced pins in such a manner that upward pressure on the teeth of said saw causes a clamping of said saw blade to said pins in a direction longitudinal to the length of the saw, clamping plates carried by said handle, each of said plates having spaced pins in axial alignment with each other and means for drawing said plates toward each other whereby when said last mentioned pins are moved toward each other their abutting ends will extend into said saw blade.

ALPHONSE LOUGHLIN.